Aug. 13, 1940.  O. W. PINEO  2,211,628
SECTOR PHOTOMETER
Filed Feb. 9, 1939    3 Sheets-Sheet 2

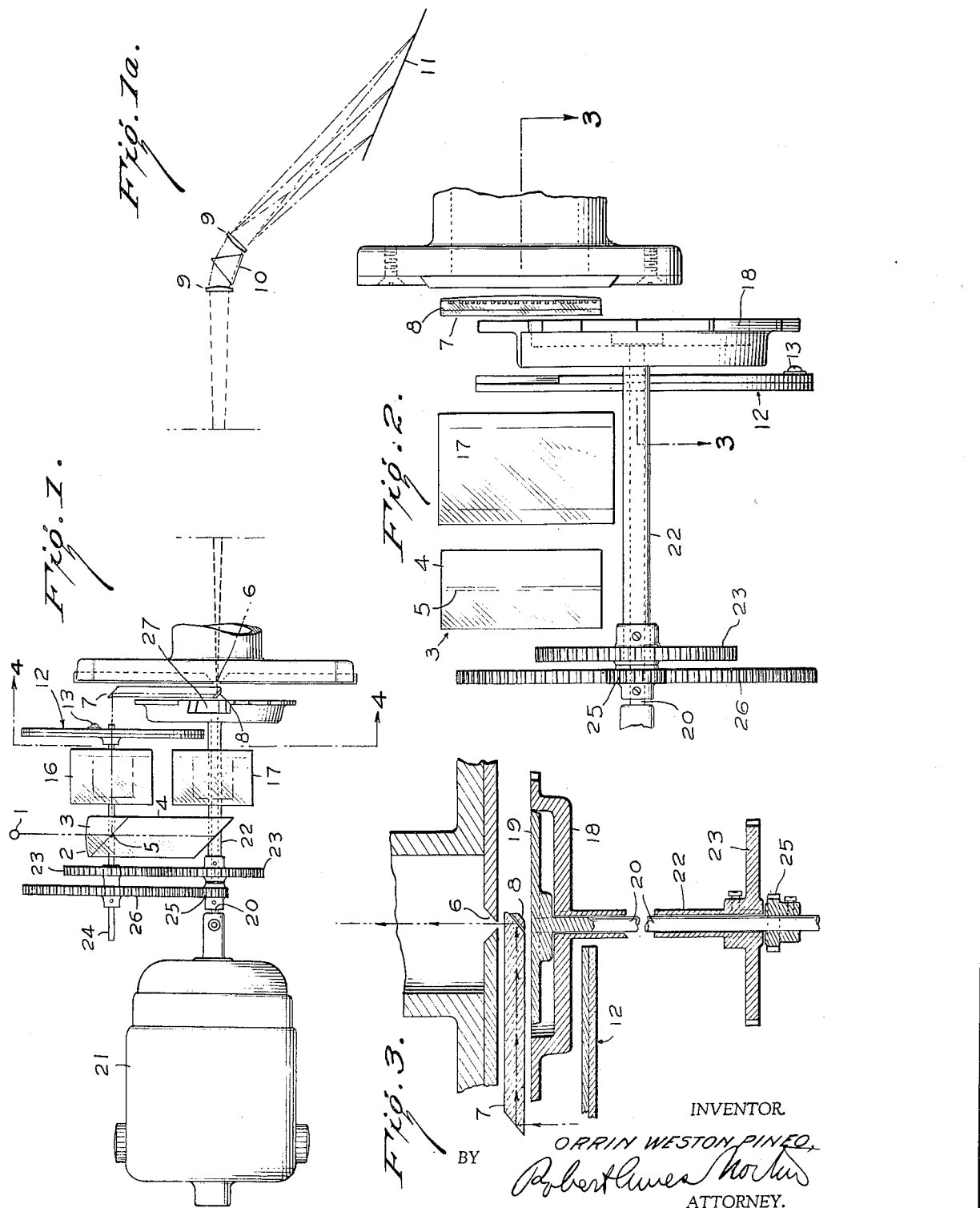

INVENTOR.
ORRIN WESTON PINEO,
BY Robert Ames Norton
ATTORNEY.

Aug. 13, 1940.   O. W. PINEO   2,211,628
SECTOR PHOTOMETER
Filed Feb. 9, 1939   3 Sheets-Sheet 3
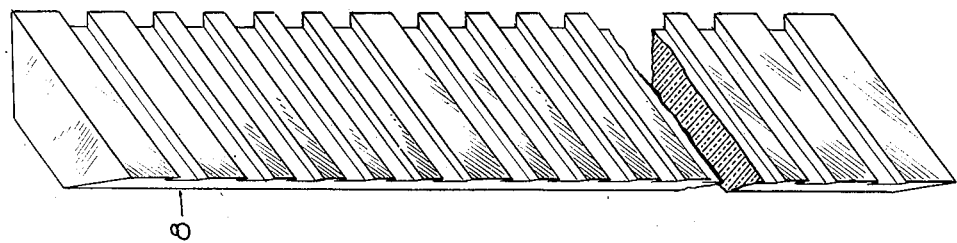
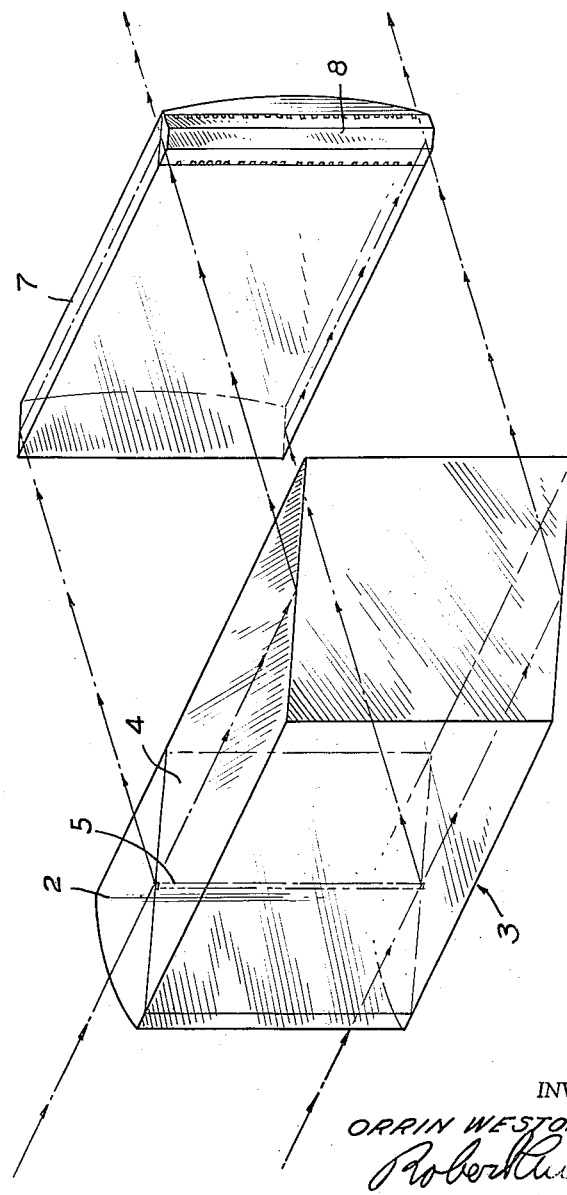
INVENTOR.
ORRIN WESTON PINEO,
ATTORNEY.

Patented Aug. 13, 1940

2,211,628

UNITED STATES PATENT OFFICE 2,211,628

SECTOR PHOTOMETER

Orrin Weston Pineo, Milo, Maine, assignor, by mesne assignments, to American Cyanamid Company, New York, N. Y., a corporation of Maine Application February 9, 1939, Serial No. 255,423

2 Claims. (Cl. 88—14)

This invention relates to sector photometers for use with spectrographs. More particularly, the present invention is directed to spectrograph sector photometers for ultra-violet absorption spectrophotometry.

In the past, considerable difficulty has been encountered in obtaining curves showing the spectral transmission of materials in the ultraviolet. The photoelectric machines which are available for automatically recording spectrophotometric curves in the visible spectrum are not easily adapted for the ultra-violet spectrum. In the past, it has been the practice to obtain photographic spectrograms in which a plurality of spectra of the sample are compared against a similar number of reference spectra, the reference spectra being given varying exposures. From these pairs of spectra, the points at which photographic densities of the two spectra match are plotted and a curve drawn. This gives a result of reasonable accuracy where the curve does not show sudden peaks, but it is very time-consuming and also requires expensive apparatus. The large number of spectra which is necessary, to obtain a sufficient number of points to give a curve which is reasonably accurate, also requires a relatively large photographic plate which increases the cost of operation.

The present invention avoids all of the difficulties which are encountered in the spectrograms described above. Essentially, in the present invention, a single exposure is made of a plurality of juxtaposed narrow spectra, alternately of the test sample and the reference sample. These spectra are in the form of very narrow bands of the order of magnitude of a fraction of a millimeter. The exposures of the reference spectra are equal so that these spectra form a grid of similar narrow lines on the photographic plate onto which they are focused. In the case of a light source emitting light in spectral lines or broad bands, each line will, of course, be non-uniformly blackened. The test spectra alternate between reference spectra and form a grid of lines of different degrees of density among themselves, the bottom line receiving the greatest exposure and the others, proceeding upward, receiving less in suitable logarithmic steps. The variation is obtained by a rotating step sector which interposes in steps an increasing sector angle of metal, or other suitable absorbing material of which the sector may be constructed, so that the effective exposure of the various test spectra decreases from the bottom to the top. In addition to the step sector, the beams for the test spectra pass through a sample and show, therefore, varying absorption at different parts of the spectrum depending on the absorption of the sample for light of different wave lengths. The reference beam passes through a uniform reference sector adjusted so that the blackening of the reference spectra just matches the test spectrum with the shortest exposure and with a sample of zero absorption.

The composite spectra obtained when there is no sample will show an overall darkening from top to bottom—from a medium grey at the top where the reference and test spectra are equally dark, to the bottom where the reference spectra are the same but where the test spectra are many times overexposed. If a sample is introduced having varying absorption at different wavelengths, the test spectra will be less exposed, and the region of medium grey where reference and test spectra are equally dark will be shifted toward the bottom depending on the sample absorption at different wavelengths, thereby marking out a spectrophotometric curve of sample transmission. This spectrophotometric curve is conspicuous when the composite spectra are not examined closely, because it separates two regions, above and below, which are distinctly striped due to unequal exposure of reference and test spectra; on the other hand, the intermediate region of the curve is not striped but more or less uniformly grey due to nearly equal exposure of reference and test spectra. Close examination shows the region above the curve to have darker reference spectra and the region below the curve darker test spectra; this distinction is made more apparent by making the spectra of three different widths—all the similar reference spectra of a medium width, every fifth one of the progressively different test spectra of a broader width to identify every fifth step of the step sector, and the intervening test spectra of a narrower width. In actual use, the precise points where the two kinds of spectra match are determined with a magnifier and marked with ink, thus defining with precision the spectrophotometric curve whose trend is immediately conspicuous as stated.

It is convenient to have the match points read directly in sample density, to within a small additive correction, where optical density is defined as the negative logarithm of transmission. In this case the test spectra can be identified with sample density, say from 0.0 at the top to 2.0 at the bottom in twenty steps of 0.1 each. This particular arrangement is shown in the figures later to be described, and uses twenty-one test spectra with twenty-two reference spectra bounding them. A corresponding logarithmic relation is required between the step sector openings. In calculating sample density, a sample of zero density through the least open step D of the step sector should be adjusted to match the reference spectra. As stated above, D is conveniently made equal to some definite figure for optical density, for example, 2.0. When the unknown sample is substituted, a density D' of the step sector matches the reference spectra. The sample density $d$ is therefore equal to D—D'. It is convenient to identify the sector steps by the apparent sample density $d'=2.0-D'$. Now if adjustment is not perfect, a known zero density sample matches with a reference spectrum which is further up. Calibration of the machine is effected by adjustment of the sector opening controlling the density of the reference beams so that a 0 density sample will match with the reference spectrum corresponding to 0 density.

The operation of the present invention has been described in conjunction with a device using equally exposed reference spectra. This method is advantageous because, irrespective of sample density, the match is always made at the blackening of the similar reference spectra. Therefore, the matches can be made irrespective of the sample throughout the spectral region in which the blackening of the similar reference spectra is not excessively small or great; that is to say, the entire exposure latitude of the plate is available to cover the spectral variations of source intensity and plate sensitivity because the reference spectra are all of the same density at any one point. If a match is obtained by varying the density of the different reference spectra then a large portion of the latitude of the photographic plate must be used to cover the range of density of reference spectra through which matching takes place and leaves little or no latitude for variation in the density of all of the spectra due to the variations in the spectral intensity of the source or plate sensitivity in different portions of the spectrum.

The step sector may be of various types. However, if a single sector is used with twenty-one steps varying logarithmically over the density range 0.0–2.0, the ratio between the largest sector opening and the smallest will be 100 to 1. This makes it difficult to produce the small sectors accurately and while a single step sector can be used and is included in the broader scope of the invention, I prefer to use a compound step sector consisting of a larger part revolving relatively slowly, and bearing on its outer stepped portion the larger sector openings and on its inner portion a much deeper step whose opening is say one-seventh of the whole circle. Covering the deep step is a smaller part, revolving coaxially and seven times as fast, bearing in steps other sector openings (corresponding to the smaller ones if a single step sector were used) which are extended seven times because they are effective through the deep sector only one revolution in seven. The ratio between the largest sector opening on the slow sector and the smallest on the fast sector would, therefore, be about 14 to 1 instead of 100 to 1.

The reference beam which is not passed through a sample requires a smaller angular aperture at the source; the beam is thus less affected by chromatism, and can be made more nearly representative of the test beam by using a small fraction of the test beam itself. This allows a very simple construction which is highly accurate, although a slightly more complex construction comprising, say, three narrow stripes of test beam to form a single reference beam gives theoretically a more representative reference in spectral regions of high prism absorption. In most cases, however, the slight additional complications involved are not necessary.

Chromatism is a serious factor because in the great range of the photographic spectrum, the focal length of a quartz lens may vary by as much as 20%. If the varying image position given by one lens were imaged by a second lens, the chromatic variation in the second image would make it entirely valueless. In the present invention, however, it is possible to use only a single crossed cylinder lens which reduces chromatic error.

While various means may be used for obtaining a test beam and a narrow reference beam which are then passed respectively through sample and step sector, and through the reference sector, the simplest and most reliable construction is to use two surfaces in optical contact except where a narrow stripe is roughed out so as to reflect into a different direction by total internal reflection, a narrow portion of the test beam traversing the surfaces thereby forming a reference beam. After passing through the sample and sectors, the beams can be recombined in similar manner at the spectrograph entrance slit to form the juxtaposed spectra described above. In order to produce intense slit illumination and consequently short exposure times, it is desirable to focus the width of the light source onto the slit by an intervening cylindrical lens common to the beams before they are separated. In order to produce test spectra that are exposed uniformly (except for the variations purposely introduced by the sample and the step sector) and in order to produce reference spectra which are exposed uniformly and proportionally to the test spectra, the illumination of the spectrograph entrance slit is made uniform along its length (independently of unavoidable variations in the size and brightness of the light source along its length) by focusing the length of the light source onto the spectrograph dispersing prism by means of a cylindrical lens in the recombined beams at the spectrograph slit. These cylindrical lenses are incorporated into the two optical parts which respectively separate and recombine the beams. The optics are constructed of crystal quartz, or of the finest grade of fused quartz for ease in obtaining optical contact. Permanent alignment and high optical efficiency are obtained by the method described above and this constitutes a preferred embodiment of the invention.

Other means than rotating sectors are available for varying the exposure of the test spectra in a manner independent of wavelength—for instance, a step neutral wedge. Such a wedge can be made by sputtering or evaporating onto a quartz plate a thin film of a suitable metal and controlling the thickness and transmission of the film by depositing it slowly through a rotating step sector. Metal film wedges are commonly used in ultra-violet photographic photometry where simplicity is important, but the results obtained are in general less accurate than can be obtained with rotating sectors. Although the invention is not limited to its use with rotating sectors, this embodiment of the invention is chosen to be described in conjunction with the drawings in which Fig. 1 is a plan view of the device, partly broken away;

Fig. 1a is a diagrammatic showing of the paths of the light through the dispersing prism of a spectrograph;

Fig. 2 is an elevation of a portion of Fig. 1;

Fig. 3 is a horizontal section along the line 3—3 of Fig. 2;

Fig. 4 is an end elevation of the reference and step sectors;

Fig. 5 is a perspective view of the two sectors of Fig. 4;

Fig. 6 is a perspective view of the optical parts shown in Figs. 1 to 3; and

Fig. 7 is a detailed view of the roughed out part of the beam combining optic.

The device of the present invention is provided with a light source 1, preferably a line source, the light striking a quartz prism 3 provided with a cylindrical lens surface 2 (see Figs. 1 and 6) focussing the width of the source onto the width of the spectrograph slit 6. Prism 3 is in optical contact with one face of the rhomb 4 except along a central vertical line 5 where the rhomb is roughed out in a narrow depression similar to those shown in the prism 8 in Figs. 6 and 7. The roughed out depression is of uniform width, and directs by total internal reflection a narrow reference beam toward the recombining optic 7, 8. The unreflected light continues undeviated to form the test beam which is directed toward the recombining optic 8 by reflection at the other end of rhomb 4. The two beams are recombined in similar manner by horizontal depressions in prism 8 at its interface with rhomb 7. In design of a practical machine, the depressions are preferably 0.4 mm. wide, and the lands 0.3 mm. wide except every fifth which is 0.5 mm. wide. The parts of the test beam not transmitted unchanged through the portions of the interface in optical contact, are diffused by the rough bottoms of the depressions or absorbed by a suitable coating thereon. The parts of the reference beam not reflected at the interface where prism 8 is roughed out, are transmitted unchanged through the portions of the interface in optical contact and so pass out of the system. The step sector is very close to this recombining interface so that each portion of the test beam thus selected for transmission into the spectrograph passes through its appropriate step of the step sector. Adjacent portions are separated by a portion of the reference beam so that ample space is allowed for the transition from step to step of the sector. The cylindrical lens surface between the recombining interface and the entrance slit focuses the length of the light source 1 onto the spectrograph dispersing prism 10. The grid pattern at the recombining interface is very close to the spectrograph slit and is focussed onto the photographic plate to form the composite spectra, four of which can be accommodated on a single plate, thereby allowing the measurement of four separate samples per plate.

The spectrograph is shown on a reduced scale in Fig. 1a and is of standard design. It is provided with suitable lenses 9, a dispersing prism 10, and a photographically sensitive surface 11 on which the different spectra are recorded. Three representative rays of different wavelengths are shown in dotted lines in the drawings. The particular design of the spectrograph itself does not form any part of the present invention and any suitable standard design producing spectra of convenient length may be used.

The reference beams passing between the optics 2, 3 and 7, 8 encounter a rotating reference sector 12 consisting of two discs with sector apertures. The two discs may be moved with respect to each other and clamped in any position by means of the clamp 13 which moves in the groove 14. In this manner, the size of the sector opening 15 may be adjusted (see Figs. 4 and 5). If it is desired to measure the test sample relatively to a standard sample, the latter may be placed in the beams at 16.

The test beams passing between the optics encounter the test sample, which may be a liquid contained in the quartz cell 17, and a compound step sector consisting of a slowly rotating outer portion 18 and a rapidly rotating inner portion 19. The inner portion turns on an axle 20 which is directly connected to the driving motor 21 and the outer portion turns on a sleeve 22 surrounding the shaft 20 and turned by a pair of gears 23 from the shaft 24 of the reference sector 12. This shaft in turn is driven from the shaft 20 by a pair of gears 25 and 26 at a rate one seventh that of the shaft 20. As a result, the reference sector 12 and the outer portion 18 rotate at one seventh of the motor speed whereas the inner portion 19 rotates at motor speed. Both portions 18 and 19 are provided with sector openings arranged logarithmically in steps, except that the sector openings on the inner portion are seven times as long as they would otherwise have to be because the inner portion passes its beams for only one revolution in seven because of the superposed sector opening 27 in the outer portion which is one seventh of the whole circle.

An examination of Fig. 4 will show that each of the reference beams is interrupted only by the uniform reference sector 12 whereas each of the sample beams is interrupted by a particular step of one or other of the two step sectors 18 and 19, the steps being so chosen that the exposure of the various beams decreases logarithmically from the top beam in Fig. 4 to the bottom beam. In the device as shown, there are twenty-one steps covering a density range of 2 to 0, that is to say, an exposure range of 100 to 1.

It will be apparent that the exposure of the reference beams can be varied over wide limits by adjustment of the sector opening 15. In practice, this is normally adjusted to a certain opening which will give a reference grid matched to the least exposed test spectrum for a sample of zero absorption. When dealing with different types of samples, it is sometimes desirable to vary the reference grid exposure as can be done by adjusting the sector opening 15. By reducing the opening 15 to one-tenth, sample densities between 1.0 and 3.0 are measured just as previously for the range 0.0 to 2.0. It is an advantage of the present invention that the machine can be adjusted to give results even with samples of very widely varying densities. Normally, for samples of substantially similar densities, the machine is set once and not readjusted but the possibility of adjustment forms an important specific feature of the preferred embodiment of the machine. The exposure time in any case is selected to give the most satisfactory exposure of the reference grid in the wave-length region of particular interest. With the efficient light gathering power of the present invention, the exposure time is conveniently short, say five seconds, and the sectors should be rotated correspondingly fast, say by a common 5000 R. P. M. motor.

What I claim is:

1. An absorption spectrophotometer comprising a light source, means for separating light from said source into two beams one of which is much more intense than the other, means for interposing test and standard samples of substantially uniform thickness in the paths of said beams, the standard sample being in the beam of lesser intensity, a spectrograph, means for recombining the beams at the entrance slit of the spectrograph comprising two elements of transparent material having an interface near the slit and in optical contact except along a plurality of narrow bands distributed along the length of the slit where one surface is relieved from contact with the other, the orientation of the interface with respect to the beams being such that one of the beams is transmitted undeviated into the spectrograph through the portions of the surfaces in contact and that the other of the beams is deviated into the spectrograph by total internal reflection from the bands where the surfaces are not in contact, whereby there is produced on the recording plate of the spectrograph a plurality of spectra from one of the beams immediately bounded by a plurality of spectra from the other beam, and means in the test sample beam only to control the relative exposure of the separate spectra produced by said beam by controlling the time during which said spectra are exposed in the spectrograph.

2. An absorption spectrophotometer according to claim 1 in which the means separating the light from the source into two beams comprises a cylindrical lens which concentrates the light from the source into a narrow band of light passing through two elements of transparent material having an interface in optical contact except along at least one relatively narrow line parallel to the band where one surface is relieved from contact with the other, the orientation of the interface with respect to the beam being such that the band is transmitted undeviated and then passes through the test sample and the light striking the narrow line is deviated by total internal reflection where the surfaces of the interface are not in contact and passes through the standard sample.

ORRIN WESTON PINEO.